(12) United States Patent
Gerwig et al.

(10) Patent No.: US 10,840,973 B2
(45) Date of Patent: Nov. 17, 2020

(54) METHOD FOR TRANSFERRING DATA BETWEEN AN AUTOMATION FIELD DEVICE AND A COMMUNICATION BOX

(71) Applicant: Endress+Hauser SE+Co. KG, Maulburg (DE)

(72) Inventors: Simon Gerwig, Schopfheim (DE); Harald Schäuble, Lörrach (DE); Wolfgang Brutschin, Schopfheim (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 0 days.

(21) Appl. No.: 16/341,737

(22) PCT Filed: Aug. 29, 2017

(86) PCT No.: PCT/EP2017/071599
§ 371 (c)(1),
(2) Date: Apr. 12, 2019

(87) PCT Pub. No.: WO2018/068941
PCT Pub. Date: Apr. 19, 2018

(65) Prior Publication Data
US 2019/0268038 A1    Aug. 29, 2019

(30) Foreign Application Priority Data

Oct. 13, 2016   (DE) .................. 10 2016 119 548

(51) Int. Cl.
*H04B 3/54*       (2006.01)
*H04L 12/40*      (2006.01)
*H04L 12/10*      (2006.01)

(52) U.S. Cl.
CPC ............. *H04B 3/542* (2013.01); *H04B 3/548* (2013.01); *H04L 12/10* (2013.01); *H04L 12/40045* (2013.01)

(58) Field of Classification Search
None
See application file for complete search history.

(56) References Cited

U.S. PATENT DOCUMENTS 4,737,787 A * 4/1988 Ito ..................... G08C 19/02
                                                340/870.18
4,843,890 A * 7/1989 Samson ............... G01F 1/8413
                                                73/861.356
(Continued)

FOREIGN PATENT DOCUMENTS

DE       19609290 A1    4/1997
DE       19609290 A1 *  4/1997    ............. G01P 15/18
(Continued)

OTHER PUBLICATIONS

International Search Report for Patent Application No. PCT/EP2017/071599, WIPO, dated Oct. 30, 2017, 12 pp.

*Primary Examiner* — Berhanu Tadese
(74) *Attorney, Agent, or Firm* — Mark A. Logan; Endress+Hauser (USA) Holding Inc.

(57) ABSTRACT

The present disclosure relates to a method for transferring data between an automation field device and a communication box, wherein the method comprises: voltage modulation of the supply voltage of the field device by the communication box such that a first communication signal is produced and the supply voltage has the first communication signal; demodulation of the first communication signal from the supply voltage applied to the field device by means of the two-wire line such that the first communication signal is separated from the supply voltage; current modulation of an output current of the field device by the field device such that a second communication signal is produced and the output current has the second communication signal; demodulation of the second communication signal from the output current (Continued)

by the communication box such that the second communication signal is separated from the output current.

13 Claims, 1 Drawing Sheet

(56) References Cited

U.S. PATENT DOCUMENTS

| | | | | |
|---|---|---|---|---|
| 4,879,911 | A * | 11/1989 | Zolock | G01F 1/8413 73/861.356 |
| 6,907,082 | B1 * | 6/2005 | Loechner | G08C 19/02 251/129.01 |
| 7,503,816 | B2 * | 3/2009 | Blaak | H01R 13/6633 439/894 |
| 7,587,953 | B2 * | 9/2009 | Wittmer | G01N 27/286 73/31.05 |
| 7,813,368 | B2 * | 10/2010 | Ootaka | G08C 19/02 370/419 |
| 8,031,705 | B2 * | 10/2011 | Kort | H04L 12/40 370/359 |
| 8,073,991 | B2 * | 12/2011 | Alley | G05B 19/0423 710/33 |
| 8,195,590 | B1 * | 6/2012 | Coggins | G01F 22/00 706/45 |
| 8,223,035 | B2 * | 7/2012 | Spanke | H04Q 9/00 340/870.07 |
| 9,106,488 | B1 * | 8/2015 | Haran | H04L 27/12 |
| 9,203,665 | B1 * | 12/2015 | Haran | H04L 25/40 |
| 9,672,730 | B2 * | 6/2017 | Wohrle | H04B 3/46 |
| 10,437,216 | B2 * | 10/2019 | Seiler | G05B 19/4185 |
| 2003/0093519 | A1 * | 5/2003 | Jackson | G05B 19/0423 709/224 |
| 2006/0161359 | A1 * | 7/2006 | Lalla | G01F 1/8431 702/65 |
| 2006/0233119 | A1 * | 10/2006 | Cline | H04L 51/04 370/257 |
| 2007/0184704 | A1 * | 8/2007 | Blaak | H01R 13/6633 439/354 |
| 2008/0007307 | A1 * | 1/2008 | Freiburger | G05B 19/0425 327/114 |
| 2008/0012428 | A1 * | 1/2008 | Lalla | G01F 1/8413 307/97 |
| 2008/0013226 | A1 * | 1/2008 | Kirst | H02H 9/008 361/18 |
| 2008/0015799 | A1 * | 1/2008 | Lalla | G01F 1/8409 702/65 |
| 2008/0147336 | A1 * | 6/2008 | Karbula | G16Z 99/00 702/64 |
| 2008/0163937 | A1 * | 7/2008 | Esposito | F16K 37/0091 137/487.5 |
| 2008/0236679 | A1 * | 10/2008 | Esposito | G05D 7/0629 137/487.5 |
| 2008/0288933 | A1 * | 11/2008 | Budmiger | G01F 25/0007 717/168 |
| 2009/0110039 | A1 * | 4/2009 | Kort | H04B 3/54 375/222 |
| 2009/0168857 | A1 * | 7/2009 | Golborne | H04L 27/1563 375/223 |
| 2010/0007247 | A1 * | 1/2010 | Tabelander | H02N 2/18 310/339 |
| 2010/0259101 | A1 * | 10/2010 | Micallef | G01D 21/00 307/26 |
| 2010/0306567 | A1 * | 12/2010 | Seiler | G05B 19/4185 713/330 |
| 2011/0286542 | A1 * | 11/2011 | Shelburne | H04L 27/12 375/272 |
| 2012/0020430 | A1 * | 1/2012 | Haase | H03M 3/438 375/295 |
| 2012/0182119 | A1 * | 7/2012 | Vetter | H04W 4/80 340/4.3 |
| 2012/0220218 | A1 * | 8/2012 | Laible | H04L 67/04 455/39 |
| 2012/0265361 | A1 * | 10/2012 | Billingsley | H02J 3/14 700/295 |
| 2014/0015691 | A1 * | 1/2014 | Wohrle | H04B 17/10 340/870.21 |
| 2014/0140445 | A1 * | 5/2014 | Singh | H04L 27/14 375/328 |
| 2015/0002111 | A1 * | 1/2015 | Brudermann | H02M 3/156 323/265 |
| 2015/0103957 | A1 * | 4/2015 | Agar | H04L 27/106 375/334 |
| 2015/0155892 | A1 * | 6/2015 | Haase | H01Q 1/2291 455/129 |
| 2016/0006261 | A1 * | 1/2016 | Pilz | H02J 5/005 307/104 |
| 2018/0115281 | A1 * | 4/2018 | Pilz | H03D 1/18 |
| 2018/0150094 | A1 * | 5/2018 | Conroy | G05F 1/66 |
| 2018/0234263 | A1 * | 8/2018 | Wunderlich | H04L 25/0264 |
| 2018/0349127 | A1 * | 12/2018 | Haase | G06F 8/654 |
| 2019/0007100 | A1 * | 1/2019 | Yamashita | H04B 3/548 |
| 2019/0036730 | A1 * | 1/2019 | Dresselhaus | G05B 19/0428 |
| 2019/0137357 | A1 * | 5/2019 | Maier | G05B 19/048 |
| 2019/0268038 | A1 * | 8/2019 | Gerwig | H04L 12/10 |

FOREIGN PATENT DOCUMENTS

| | | | | |
|---|---|---|---|---|
| DE | 19609290 C2 | * | 12/2002 | ............ B60R 21/01 |
| DE | 102016119548 A1 | * | 4/2018 | ............ H04B 3/542 |
| EP | 3526928 A1 | * | 8/2019 | ............ H04B 3/542 |
| GB | 1542629 | | 3/1979 | |
| GB | 1542629 A | * | 3/1979 | ............ H04Q 3/625 |
| WO | WO-2005031339 A1 | * | 4/2005 | ............ G01N 27/4165 |
| WO | WO-2005103851 A1 | * | 11/2005 | ............ G05B 19/042 |
| WO | 2015061187 A2 | | 4/2015 | |
| WO | WO-2016165928 A1 | * | 10/2016 | ......... H04L 25/0298 |
| WO | WO-2018068941 A1 | * | 4/2018 | ............ H04B 3/542 |

* cited by examiner

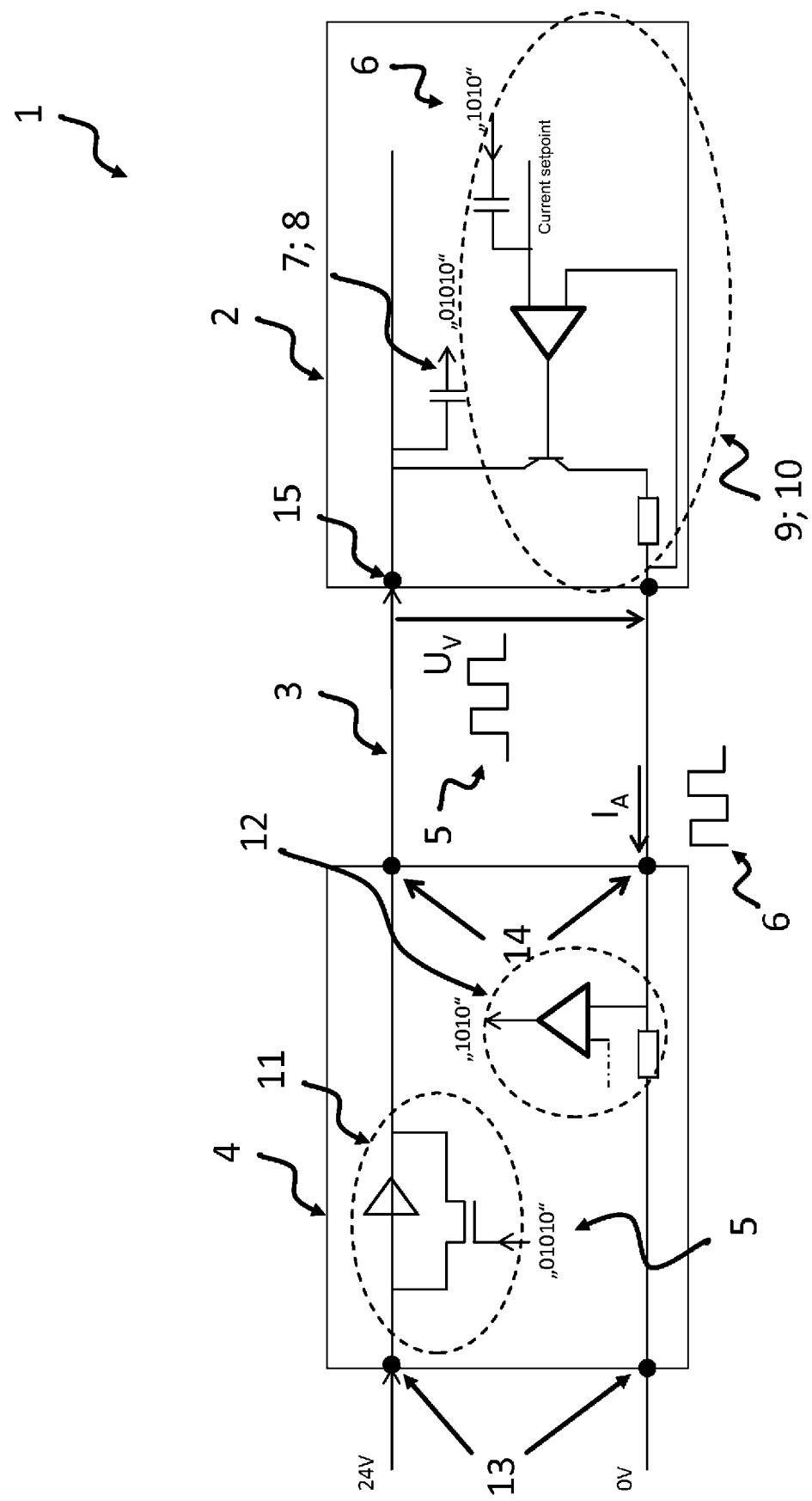

METHOD FOR TRANSFERRING DATA BETWEEN AN AUTOMATION FIELD DEVICE AND A COMMUNICATION BOX

CROSS-REFERENCE TO RELATED APPLICATIONS

The present application is related to and claims the priority benefit of German Patent Application No. 10 2016 119 548.0, filed on Oct. 13, 2016 and International Patent Application No. PCT/EP2017/071599, filed on Aug. 29, 2017 the entire contents of which are incorporated herein by reference.

TECHNICAL FIELD

The invention relates to a method for transferring data between an automation field device and a communication box, an automation field device and also a communication box.

BACKGROUND

Field devices for recording and/or modifying process variables are typically used in process automation, as well as in manufacturing automation. Measuring devices or sensors, such as level measuring devices, flow meters, pressure and temperature measuring devices, pH-redox potential meters, conductivity meters, etc., are used for recording corresponding process variables such as fill-level, flow, pressure, temperature, pH level and conductivity. Actuators, such as, for example, valves or pumps, are used to influence process variables. Thus, the flow rate of a fluid in a pipeline section or a fill-level in a container can be altered by means of actuators.

The company group Endress+Hauser produces and distributes a large variety of such field devices.

It is also common in automation to build the field devices in a so-called two-conductor technology and to connect them to each other such that the power feed and communication of the process variable between the field devices can take place via a single pair of lines (two-wire line).

For this purpose, such field devices have an analog current or voltage output, for example a 4 to 20 milli-amp (mA) current output or a 0 to 10 Volt (V) voltage output. Only the transmission of the process variable or the measured value is possible via this current or voltage output. If a further data transmission between the participants connected to the two-wire line is desired, the Highway Addressable Remote Transducer (HART) protocol, for example, is resorted to. By means of HART communication, the field devices can very flexibly be parametrized and placed in service or can read additional calculated and stored measured values or data. The HART protocol enables bidirectional communication, even in a potentially explosive environment, via a point-to-point transmission of at least two participants. In this case a frequency shift keying (FSK) method is used that employs different frequencies of a sinusoidal signal (e.g. Bell 202 standard: "0" 2200 Hertz (Hz), "1" 1200 Hz) to distinguish between the binary states. The discretized and digitized data are transmitted and received, inter alia, by a special modem, which must be present in each participant, in a HART protocol by means of the FSK method.

However, the components used for implementing a HART communication, in particular the FSK modem, require a relatively large amount of space and are, also moreover relatively expensive, which is not desirable in particular in the case of field devices to be produced at low cost.

SUMMARY

It is therefore an object of the invention to propose a communication method that is cost-effective and saves on space as much as possible.

The object is achieved according to the invention by a method for data transmission between an automation field device and a communication box, wherein the communication box is connected to the field device via a two-wire line and a supply voltage is applied to the field device via the two-wire line in order to supply the field device with power, wherein the method provides the following steps:

voltage modulation of the supply voltage of the field device by the communication box such that a first communication signal is produced and the supply voltage has the first communication signal;

demodulation of the first communication signal from the supply voltage applied to the field device via the two-wire line such that the first communication signal is separated from the supply voltage;

current modulation of an output current of the field device by the field device such that a second communication signal is produced and the output current has the second communication signal;

demodulation of the second communication signal from the output current by the communication box such that the second communication signal is separated from the output current.

According to the invention, a method is proposed in which data relating to the current consumption of the field device and its supply voltage can be communicated. For this purpose, a communication box is introduced into a two-wire line between the field device and a supply unit. According to the invention, an inquiry in the form of a first communication signal is modulated onto the supply voltage via the communication box and the inquiry is demodulated in the field device. The response in the form of a second communication signal is modulated onto an output current of the field device and this is demodulated again at the communication box. The data to be communicated are modulated one to one, i.e. without change, onto the supply voltage and not—as is typical in other communication methods, for example HART, in which a frequency shift keying takes place—changed for the purpose of data transmission.

The proposed communication method can be used, for example, in manufacturing to program the field device as well as in the final tuning and the so-called last check. Furthermore, it is also possible via the communication method to link the communication box to the field device so as to conduct data and to equip the communication box with further functionalities, for example radio communication, in order to thereby also expand the field device with these functionalities.

An advantageous embodiment of the invention provides that, for voltage modulation of the supply voltage, a voltage value of the supply voltage is varied such that the supply voltage has the first communication signal.

A further advantageous embodiment of the invention provides that, for current modulation of the output current of the field device, a current value of the output current is varied such that the output current has the second communication signal.

An advantageous embodiment of the invention provides that direct current (DC) components of the supply voltage are filtered out by the field device in order to demodulate the first communication signal from the supply voltage.

An advantageous embodiment of the invention provides that the first and/or the second communication signal is/are produced according to a universal asynchronous receiver transmitter (DART) protocol, serial peripheral interface (SPI) or an Inter-Integrated Circuit (IC) protocol.

The object is also achieved by an automation field device which can be connected to a two-wire line for power supply, comprising:

a demodulation unit having a capacitance, wherein the capacitance separates a first communication signal modulated onto the supply voltage of the field device from the supply voltage such that the first communication signal is available to the field device;

a modulation unit configured to modulate a second communication signal onto an output current of the field device such that the second communication signal is transmittable via the output current of the field device.

An advantageous embodiment of the field device according to the invention provides that the demodulation unit and/or the modulation unit does/do not have a modem, in particular does/do not have a FSK modem to separate the first communication signal from the supply voltage and/or to modulate the second communication signal.

A further advantageous embodiment of the field device according to the invention provides that the demodulation unit consists of the capacitor. Since the demodulation unit consists of a capacitor, the demodulation unit can be integrated or implemented in a particularly simple and space-saving manner in the field device.

A further advantageous embodiment of the field device according to the invention provides that the field device is designed to transmit a process variable relating to a loop current, in particular a 4 to 20 mA loop current, wherein a means for current regulation, in particular a current regulator, adjusts the loop current according to the process variable and the means for current regulation is part of the modulation unit and is furthermore set up to modulate the second communication signal onto the loop current such that the loop current has the second communication signal.

An alternative embodiment of the field device according to the invention provides that the field device is configured to transmit a process variable to a voltage signal, in particular a 0 to 10 V voltage signal, wherein the modulation unit is designed in such a way that a first terminal is connected to a second terminal for the two-wire line via a means for current regulation, which in particular has a controllable resistance, and the means modulates the second communication signal as output current onto an induced current of the field device.

The objective is further achieved by a communication box for transmitting data with an automation field device, wherein the communication box is connectable with the field device via a two-wire line and comprises:

a modulation unit configured to perform voltage modulation of a voltage signal of the two-wire line such that the voltage signal of the two-wire line has a first communication signal for data transmission;

a demodulation unit configured to demodulate a current signal of the two-wire line such that a second communication signal is available to the communication box.

The object is further achieved by an automation system comprising a field device according to any of the previously described embodiments, a communication box according to the previously described embodiment and a two-wire line that connects the field device to the communication box and via which the field device can be supplied with power.

An advantageous embodiment of the system according to the invention provides that the communication box has at least one further functionality in order to likewise equip the field device with this functionality, wherein the communication box exchanges data relating to the further functionality with the field device according to the previously described method. In particular the embodiment can provide that the communication box be designed via the at least one further functionality to enable connection of the communication box via a radio protocol or a cable-bound protocol, and the communication box exchanges data with the field device that relates to the radio protocol or the cable-bound protocol.

BRIEF DESCRIPTION OF THE DRAWINGS

The invention is explained in more detail based upon the following drawing. These show:

FIG. 1 shows a schematic representation of the system according to the invention comprising a field device, a communication box and a two-wire line.

DETAILED DESCRIPTION

FIG. 1 shows a schematic representation of the system according to the invention 1 comprising an automation field device 2, a communication box 4 for data transmission and a two-wire line 3.

The communication box 4 and the field device 2 are connected to one another via a two-wire line 3 so as to conduct data. Via the two-wire line 3, the field device 2 is supplied with a supply voltage UV, for example via a feed adapter (not shown in FIG. 1). In addition to the power supply, the transmission of a process variable detected by the field device 2 to a higher-level unit (not shown in FIG. 1 either), for example a programmable logic controller (PLC), also takes place via the two-wire line 3. It goes without saying that in the case where the field device 2 functions as an actuator, the control value is transmitted from the higher-level unit to the field device 2 via the two-wire line 3.

To transmit any additional data, for example for parametrization, between the communication box 4 and the field device 2, the communication box 4 has the following:

a first terminal pair 13 for the input-side connection of the two-wire line 3 such that the communication box 4 is connected via the two-wire line 3 to a supply unit, for example a measurement transducer storage device (not shown in FIG. 1).

a second terminal pair 14 for the output side connection of the two-wire line 3 such that the communication box 4 is connected to the field device 2 via the two-wire line 3.

a modulation unit 11 arranged in the communication box 4 between the first and the second terminal pair 13, 14. The modulation unit 11 is set up such that a voltage modulation or an amplitude modulation of a voltage signal of the two-wire line 3 takes place according to a first communication signal 5 for data transmission. This can be realized, for example, by one or more diodes which can be short-circuited via a switch, in particular a controllable field-effect transistor. The first communication signal is modulated onto the voltage signal of the two-wire line via the controllable switch and the diode or diodes. The voltage signal is thus available to the field device 2 as supply voltage at the second terminal pair 14 of the communication box 4 such that the first communication signal 5 is transmitted to the field device 2 via the two-wire line 3. The first communication signal 5 transmitted via the voltage modulation is represented by way of example in FIG. 1 by a "01010" signal at the input of the field device 2.

a demodulation unit 12 arranged between the first and the second terminal pair 13, 14 in the communication box 4. The demodulation unit 12 is arranged in such a way that a current signal originating from the two-wire line 3 connected to the second terminal pair 14 is demodulated. For this purpose, the demodulation unit 12 preferably comprises a resistor which is arranged between the first and the second terminal pair in such a way that the current signal passes through the resistor, and an operational amplifier which produces the second communication signal from a voltage drop produced by the resistor. The second communication signal 6 transmitted by the current modulation is represented by way of example in FIG. 1 by a "1010" signal.

In principle, the communication box 4 can also be equipped with a functionality other than the one for the parametrization. For example, it can have a radio module such that data can be exchanged wirelessly with another device via the radio module of the communication box 4 and the data be exchanged wirelessly between the communication box and the field device corresponding to the method according to the invention.

For transmitting the additional data, a corresponding field device 2 has the following:

a terminal pair 15 for connecting the two-wire line 3. The field device 2 is supplied with power via the connected two-wire line 3. In the example shown by way of example in FIG. 1 field device 2 is supplied with a voltage of 24 V.

a demodulation unit 7 having a capacitance 8 which demodulates or separates the first communication signal 5 modulated onto the supply voltage $V_S$ by the communication box 4. The capacitance 8 can be, for example, a single capacitor or a plurality of capacitors connected in series and/or in parallel. The first communication signal 5 is thus available after the capacitance 8 without a modem, in particular without a FSK modem, and can be further processed, for example, by a microcontroller. FIG. 1 shows the simplest case by way of example, wherein the demodulation unit 7 requires only a single capacitance 8, for example in the form of a capacitor. In contrast to the communication methods known from the prior art, in particular HART, it is thus possible to realize a space-saving and cost-effective data transmission.

a modulation unit 9 which is set up to modulate a second communication signal 6 onto an output current $I_A$ of the field device in such a manner that the second communication signal 6, which for example serves as a response signal to the first communication signal 5, can be transmitted via the output current $I_A$ of the field device 2 to the communication box 4. For this purpose, the modulation unit 9 carries out a current modulation of the output current $I_A$ or an amplitude modulation of the output current. In the example shown by way of example in FIG. 1, the field device 2 is designed as a two-wire or two-conductor field device corresponding to the 4 to 20 mA standard, and a process variable detected by the field device 2 is transmitted via a loop current that can be regulated by a current regulator 10. For this purpose, the current regulator 10 receives a current setpoint value representing the process variable during normal measuring operation, for example from the microprocessor, and regulates the loop current to a value corresponding to the current setpoint value. According to the invention, the current regulator 10 is also part of the modulation unit and is further configured to modulate the second communication signal 6 onto the loop current to be regulated corresponding to the process variable. The current regulator essentially adds the second communication signal to the loop current to be set.

However, an alternative embodiment of the field device 2 is also conceivable in such a way that the process variable is not transmitted via a loop current but via a voltage signal. For example, the process variable may be transmitted via a 0 to 10 V voltage signal. In the case of field devices in accordance with this embodiment, no current regulator is provided for regulating the current. For this reason, the modulation unit has a means for current regulation, wherein the means connects a first terminal of the terminal pair to a second terminal of the terminal pair. The second communication signal 6 can be modulated via this means onto an induced current of the field device. The means may comprise, for example, a resistor and a field effect transistor, wherein the field effect transistor is arranged in series with the resistor in such a manner that the current which flows through the resistor can be modulated by the field effect transistor.

The correspondingly designed communication box 4 and the field device 2 thus enable a method for data transmission to be implemented in a simple manner. The method for data transmission provides that, in a first method step, the supply voltage $V_S$ of the field device 2 is amplitude-modulated by the communication box 4 such that a first communication signal 5 is produced. The first communication signal 5 can be produced in accordance with a UART, SPI or IIC protocol. In a second method step, the supply voltage $V_S$ applied to the field device 2 via the two-wire line 3 is demodulated in such a manner that the first communication signal 5 is obtained from the supply voltage $V_S$ applied to the field device. The first communication signal 5 can then be further processed. For example, a microcontroller or microprocessor can parametrize the field device 2 according to the parameter information transmitted by means of the first communication signal 5. In a third method step, the field device carries out a current modulation or an amplitude modulation of the output current $I_A$ of the field device such that the output current has the second communication signal. The second communication signal 6 is thus transmitted to the communication box 4 via the output current $I_A$. In a fourth method step, the communication box 4 demodulates the output current $I_A$ such that the second communication signal 6 is separated from the output current $I_A$ and the communication box 4 is available for further processing.

The invention claimed is:

1. A method for transferring data between an automation field device and a communication box, comprising:
   connecting the communication box to the field device via a two-wire line;
   applying a supply voltage to the field device via the two-wire line to supply the field device with power;
   modulating the supply voltage to the field device by the communication box such that a first communication signal is produced and the supply voltage has the first communication signal;
   demodulating the first communication signal from the supply voltage applied to the field device via the two-wire line such that the first communication signal is separated from the supply voltage;

modulating an output current of the field device by the field device such that a second communication signal is produced and the output current has the second communication signal; and demodulating the second communication signal from the output current by the communication box such that the second communication signal is separated from the output current.

2. The method according to claim 1, wherein the modulating of the supply voltage includes varying a voltage value of the supply voltage such that the supply voltage has the first communication signal.

3. The method according to claim 1, wherein the modulating of the output current of the field device includes varying a current value of the output current such that the output current has the second communication signal.

4. The method according to claim 1, wherein the demodulating of the first communication signal from the supply voltage includes filtering out direct voltage components of the supply voltage by the field device.

5. The method according to claim 1, wherein the first communication signal and the second communication signal are produced according to a universal asynchronous receiver transmitter (DART) protocol, a serial peripheral interface (SPI) protocol, or an Inter-Integrated Circuit (IIC) protocol.

6. An automation field device that can be connected to a two-wire line to a power supply, comprising:

a demodulation unit with a capacitance, wherein the capacitance is configured to separate a first modulated voltage communication signal that is modulated onto a supply voltage of the field device from the supply voltage such that the first communication signal is available to the field device; and a modulation unit configured to modulate a second communication signal onto an output current of the field device such that the second communication signal can be transmitted via the output current of the field device.

7. The field device according to claim 6, wherein the demodulation unit and/or the modulation unit has/have no modem, in particular no frequency shift keying (FSK) modem, for separating the first communication signal from the supply voltage and/or modulating the second communication signal.

8. The field device according to claim 6, wherein the field device is configured to transmit a process variable via the output current, wherein the modulation unit includes a current regulator configured to adjust the output current according to the process variable and configured to modulate the second communication signal onto the output current such that the output current has the second communication signal.

9. The field device according to claim 6, wherein the field device is configured to transmit a process variable via a voltage signal, wherein the modulation unit is designed such that a first terminal is connected to a second terminal for the two-wire line via a current regulator that includes a controllable resistance, and the current regulator is configured to modulate the second communication signal onto an induced current of the field device as the output current.

10. A communication box for transmitting data to an automation field device and for receiving data from the automation field device, wherein the communication box is connectable to the field device via a two-wire line, the communication box comprising:

a modulation unit configured to perform voltage modulation of a voltage signal of the two-wire line such that the voltage signal of the two-wire line has a first communication signal for data transmission;

a demodulation unit configured to demodulate a current signal of the two-wire line in such a manner that a second communication signal is available to the communication box.

11. An automation system, comprising:

a field device including:

a demodulation unit with a capacitance, wherein the capacitance is configured to separate a first communication signal that is modulated onto a supply voltage of the field device from the supply voltage such that the first communication signal is available to the field device; and a modulation unit configured to modulate a second communication signal onto an output current of the field device such that the second communication signal can be transmitted via the output current of the field device;

a communication box for transmitting data to an automation field device and for receiving data from the automation field device, wherein the communication box is connectable to the field device via a two-wire line, the communication box including:

a modulation unit configured to perform voltage modulation of a voltage signal of the two-wire line such that the voltage signal of the two-wire line has the first communication signal for data transmission; and a demodulation unit configured to demodulate a current signal of the two-wire line in such a manner that the second communication signal is available to the communication box; and a two-wire line that connects the field device to the communication box and via which the field device can be supplied with power.

12. The system according to claim 11, wherein the communication box is configured to apply the supply voltage to the field device via the two-wire line to supply the field device with power and to modulate the supply voltage to the field device such that the first communication signal is produced and the supply voltage has the first communication signal, wherein the field device is configured to demodulate the first communication signal from the supply voltage such that the first communication signal is separated from the supply voltage and to modulate the output current to the communication box such that the second communication signal is produced and the output current has the second communication signal, and wherein the communication box is further configured to demodulate the second communication signal from the output current such that the second communication signal is separated from the output current.

13. The system according to claim 12, wherein the communication box is further configured to enable connection of the communication box via a radio protocol or a cable-bound protocol, and to exchange data with the field device with respect to the radio protocol or the cable-bound protocol.

* * * * *